United States Patent
Takahashi et al.

(10) Patent No.: US 8,323,530 B2
(45) Date of Patent: Dec. 4, 2012

(54) PHOSPHOR FOR SCINTILLATOR

(75) Inventors: Tsukasa Takahashi, Ageo (JP);
Motoyuki Tanaka, Ageo (JP); Shunichi Hatamoto, Omuta (JP); Hiromu Watanabe, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 13/496,254

(22) PCT Filed: Aug. 9, 2010

(86) PCT No.: PCT/JP2010/063464
§ 371 (c)(1),
(2), (4) Date: Mar. 15, 2012

(87) PCT Pub. No.: WO2011/033882
PCT Pub. Date: Mar. 24, 2011

(65) Prior Publication Data
US 2012/0168678 A1   Jul. 5, 2012

(30) Foreign Application Priority Data
Sep. 18, 2009   (JP) .................................. 2009-216906

(51) Int. Cl.
*C09K 11/08* (2006.01)
(52) U.S. Cl. ................................. 252/301.4 S
(58) Field of Classification Search ............ 252/301.4 S, 252/301.4 R; 250/370.11, 370.12
See application file for complete search history.

(56) References Cited

U.S. PATENT DOCUMENTS

| | | | | |
|---|---|---|---|---|
| 3,791,844 | A | * | 2/1974 | Tecotzky et al. .............. 428/403 |
| 4,958,080 | A | | 9/1990 | Melcher |
| 4,979,200 | A | * | 12/1990 | Umemoto et al. ............ 378/185 |
| 6,246,744 | B1 | | 6/2001 | Duclos et al. |
| 6,358,441 | B2 | | 3/2002 | Duclos et al. |
| 7,230,248 | B2 | * | 6/2007 | Fukuta et al. ............ 250/370.11 |

FOREIGN PATENT DOCUMENTS

| | | | |
|---|---|---|---|
| DE | 10-2007-005646 A1 | * | 8/2008 |
| JP | 61017082 A | | 1/1986 |
| JP | 2852944 A | | 2/1999 |
| JP | 2001072968 A | | 3/2001 |
| WO | 2005028591 A1 | | 3/2005 |

OTHER PUBLICATIONS

Van't Spijker et al., 'Lu2S3:Ce3+, A new red luminescing scintillator', 1998, Nuclear Instruments and Methods in Physics Research B, vol. 134, pp. 304-309.*
Machine translation of DE10-2007-005646A1.*
Scifinder search results.*
J C van't Spijker et al., "Lu2S3:Ce3+, A new red luminescing scintillator", Nuclear Instruments and Methods in Physics Research B 134 (1998), pp. 304-309, Elsevier Science B.V.
Carel W.E. van Eijk, "Inorganic-scintillator development", Nuclear Instruments & Methods in Physics Research A 460 (2001) pp. 1-14, Elsevier Science B.V.

* cited by examiner

*Primary Examiner* — Emily Le
*Assistant Examiner* — Lynne Edmondson
(74) *Attorney, Agent, or Firm* — The Webb Law Firm

(57) ABSTRACT

Provided is a phosphor for scintillator that can absorb radiation and convert it into visible light, and which has a short fluorescence decay time. The phosphor contains a lutetium sulfide-containing host material and an activator agent ion, for example, a phosphor comprising a composition represented by the general formula $(Lu_{1-x}Pr_x)_2S_3$, or $(Lu_{1-x}Ce_x)_2S_3$.

1 Claim, 4 Drawing Sheets

PHOSPHOR FOR SCINTILLATOR

FIELD OF THE INVENTION

The present invention relates to a phosphor that is useful as a constitutive material for scintillators used in radiation detectors or the like.

DESCRIPTION OF RELATED ART

A scintillator is a substance that absorbs radiations such as γ-rays and X-rays and emits an electromagnetic wave in visible light or at a wavelength near visible light. As applications thereof, various radiation detectors can be cited, such as, PETs (positron-emission tomography devices), TOF-PETs (time-of-flight positron-emission tomography devices) and X-ray CTs (computerized tomography devices) for medical uses, and furthermore, personal belongings examination devices used in airports, and the like.

Among them, PETs (Positron-Emission Tomography devices) are radiation detector that use an agent labeled with a positron-emitting radionuclide that generate a 511 KeV annihilation radiation to observe physiological functions such as metabolism and blood-flow volume by tomography images. This type of radiation detector is generally constituted by a scintillator unit that photo-receives a radiation beam and converts it into visible light, and a photo-detection unit that detects a visible light, which has been converted at this scintillator unit and is being transmitted, and converts it into an electric signal, such as, a photo-multiplier tube (hereinafter referred to as "photo-mul") or a photo-diode.

Conventionally disclosed as scintillator materials used in this type of application are $Lu_3Al_5O_{12}$:Pr (Patent reference 1), $Lu_2SiO_5$:Ce (Patent reference 2) and the like.

In addition, as scintillator materials containing sulfur, oxysulfides, such as $Gd_2O_2S$:Pr (Patent reference 3) and $Lu_2O_2S$:Pr (Patent reference 4) are disclosed.

PRIOR ART REFERENCES

Patent References

[Patent reference 1] Japanese Patent Application Laid-open No. 2001-72968
[Patent reference 2] U.S. Pat. No. 2,852,944 [Patent reference 3] Japanese Patent Application Laid-open No. S61-17082
[Patent reference 4] WO2005/028591

While positron tomography (PET) devices may be cited as important applications of scintillators, PET devices are known to have problems such as low spatial resolution and long examination time. If the light-emitting lifetime, that is to say, the fluorescence decay time, of the scintillator used in PET can be shortened, shortening of the examination time may be possible. In addition, anticipation of improvements in the spatial resolution of the PET device by the use of TOF (time-of-flight) information may be possible. In applications other than PET, if shortening of fluorescence decay time can be devised while maintaining the output (brightness), elevating the detection efficiencies of various detection devices may be possible.

Thus, the present invention provides a novel phosphor for scintillator that can absorb radiation and convert it into visible light obviously, and has a short fluorescence decay time.

SUMMARY OF THE INVENTION

The present invention proposes a phosphor for scintillator containing a lutetium sulfide-containing host material and an activator agent ion.

The phosphor proposed by the present invention not only can absorb radiation and convert it into visible light, it has a short fluorescence decay time. Thus, it is particularly useful as a scintillator material used in radiation detectors such as PET.

DETAILED DESCRIPTION OF THE INVENTION

Figure 1:
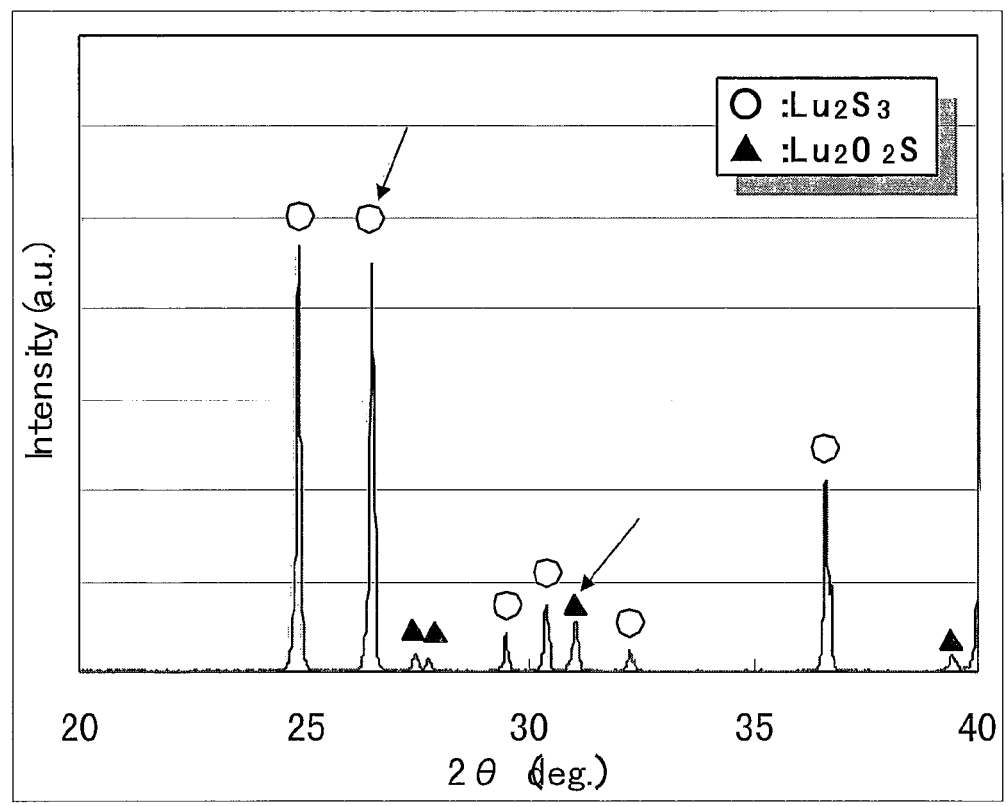
FIG. 1 An XRD pattern of a phosphor powder synthesized in Example 1.

Hereinafter, embodiments of the present invention will be described in detail; however, the scope of the present invention is not limited to the embodiments described below.

The phosphor according to the present embodiment (hereinafter referred to as "present phosphor") is a phosphor containing a lutetium sulfide-containing host material and an activator agent ion.

The present phosphor is preferably a phosphor containing a crystal represented by the general formula $(Lu_{1-x}M_x)_2S_3$ (where M represents an activator agent element).

In so doing, x in the formula is preferably 0.001 to 0.1. If x is within such a range, the amount of light emission can be maintained. Thus, from such a point of view, x is more preferably 0.1 or lower, and particularly, 0.0025 or greater or 0.05 or lower is further desirable, and most preferably 0.004 or greater but 0.015 or lower.

In addition, the present phosphor is preferably a phosphor containing a composition represented by the general formula $(Lu_{1-x}Pr_x)_2S_3$ or the general formula $(Lu_{1-x}Ce_x)_2S_3$.

In so doing, an $Lu_2O_2S$ phase or the like may be contained in addition to an $Lu_2S_3$ phase. However, greater amounts of $Lu_2S_3$ phase is desirable, since, in addition, to obtaining the desired strong light emission if $Lu_2S_3$, from the point of view of avoiding such harm as light emission near 500 nm tending to continue over several μ-seconds after irradiation with an excitation light if large amounts of $Lu_2O_2S$ phase is contained. From such points of view, containing $Lu_2S_3$ phase at 20% or more, of which 85% or more, of which 95% or more (including 100%) is particularly desirable.

As activator agent ions, that is to say, a luminescent center (light-emitting ions) of the present phosphor, ions such as of Ce, Pr, Nd, Sm, Eu, Tb, Dy, Ho, Er, Tm, Yb, Cr, Bi and Tl can be considered, of which $Pr^{3+}$ or $Ce^{3+}$ or both of these are desirable. Among these, from the points of view that visible light is emitted and that fluorescence decay time is short, $Pr^{3+}$ is particularly excellent.

Within a range in which the effects of the present invention is obtained, the present phosphor may contain other constituents in addition to the host material and the activator agent. For instance, monovalent cationic metals such as alkali metal elements and halogen ions such as $Cl^-$, $F^-$ and $I^-$ may be added to the raw materials as charge compensation agents.

However, the addition amount thereof is preferably to an extent that the charge compensation effect is obtained.

(Preparation Method)

An example of preferred preparation method for the present phosphor will be described in the following. However, there is no limitation to the preparation method described below.

The present phosphor can be obtained, for instance, by respectively weighing and mixing a Lu raw material, an activator agent raw material (for instance, a Pr raw material) and other additive raw materials, and firing in an atmosphere of hydrogen sulfide or carbon disulfide at 700 to 1500° C.

As the Lu raw materials, in addition to oxides of Lu, complex oxides, carbonates, and the like, can be cited.

As activator agent raw materials such as for Pr, in addition to oxides of Pr or the like, fluorides, carbonates, sulfides, and the like, can be cited.

Mixing of the raw materials may be carried out either dry or wet.

When dry mixing, without particularly limiting the mixing method, for instance, mixing with a paint shaker, a ball-mill or the like using zirconia ball as the medium, and as necessary drying, to obtain a raw material mixture, is sufficient.

When wet mixing, bringing the raw materials into a suspended state, mixing with a paint shaker, a ball-mill or the like using zirconia ball as the medium similarly to above, then, separating the medium with a sieve, or the like, removing the solvent from the suspension by a suitable drying method such as reduced pressure drying, vacuum drying or spray drying to obtain a dry raw material mixture, is sufficient.

Prior to firing, as necessary, grinding, sorting or drying may perform to raw material mixture obtained as described above. However, performing grinding, sorting or drying is not absolutely necessary.

It is more desirable to perform firing at 700° C. or higher.

As firing atmosphere in so doing, firing carried out in an atmosphere containing sulfur, as in hydrogen sulfide and carbon disulfide, is desirable. In particular, firing in an atmosphere containing sulfur from when heating begins (ordinary temperature) is desirable from the point of view of elevating the purity of the target substance $Lu_2S_3$.

If the firing temperature is 700° C. or higher, sufficient and uniform firing can be carried out. When hydrogen sulfide is used, 1,000° C. or higher is desirable. While the upper limit of the firing temperature is not limited in particular, on the order of 1,400 to 1,500° C. is considered when durability, or the like, of the firing oven is taken into account.

In addition, while the firing time is related to the firing temperature, on the order of 2 hours to 100 hours is desirable, and 10 hours or longer is desirable when hydrogen sulfide is used.

(Characteristics of the Present Phosphor)

As the present phosphor can achieve a fluorescence decay time of 32 nsec or less, and in a particularly preferred mode, 5 nsec or less, a rapid light-emission can be realized. The following Table 1 indicates the light-emission wavelength and the fluorescence decay-time of various phosphors, from which it can be understood that fluorescence decay times of 32 nsec or less, and particularly 5 nsec or less, are especially short. However, the light emission wavelengths and the fluorescence decay times shown in Table 1 are examples of representative values indicated for the sake of comparison, and there is absolutely no limitation to these numerical values.

TABLE 1

| Host material | Luminescent center | Light-emission wavelength nm | Decay time ns |
|---|---|---|---|
| $Bi_4Ge_3O_{12}$ | $Bi^{3+}$ | 480 | 300 |
| $Lu_2SiO_5$ | $Ce^{3+}$ | 420 | 40 |
| $Lu_3Al_5O_{12}$ | $Pr^{3+}$ | 310 | 20 |
|  | $Ce^{3+}$ | 510 | 50 |
| $LuAlO_3$ | $Pr^{3+}$ | 300 | 10 |
|  | $Ce^{3+}$ | 365 | 18 |

As noted above, if the fluorescence decay time of the scintillator used in a PET device can be shortened, not only shortening of the examination time may become possible, anticipation of improvements in the spatial resolution by the use of TOF (time-of-flight) information may be possible. In addition, in applications other than PET, if shortening of fluorescence decay time can be devised while maintaining the output (brightness), elevating the detection efficiencies of various detection devices may be possible.

Furthermore, since the present phosphor has Lu as the main constituent, which atomic number is large, it has excellent radiation absorption capability, allowing the radiation to be absorbed sufficiently even for a thinner scintillator material, and considering the radiation detector as a whole, size-reduction (thinning the thickness) is possible while maintaining function.

Consequently, the present phosphor can be used suitably as material for scintillator of various radiation detectors, such as, PETs (positron-emission tomography devices), TOF-PETs (time-of-flight positron-emission tomography devices) and X-ray CTs (computerized tomography devices) for medical uses, in addition, in personal belongings examination devices used in airports, and the like, such that various radiation detectors can be constituted using this material.

More concretely, a radiation detector can be constituted by producing a single crystal from the present phosphor, processing this into a single crystal material for scintillator and turning it into a scintillator, and combining this scintillator and a photo-detection unit such as a photo-mul or a photodiode.

In addition, the present phosphor can also be fired to produce a translucent ceramics body and used in various applications.

Moreover, the present phosphor can also be mixed with a resin to be turned into a plastic body that emits light, and used in various applications. It suffices that, for instance, the present phosphor is added to a liquid thermosetting resin (for instance, silicone resin, epoxy resin, or the like) to prepare a phosphor-containing resin composition, and once this phosphor-containing resin composition has been kneaded, this is injected into a mold (potting), and thereafter, heated to cure the resin.

(Explanation of Terms)

In the present invention, "phosphor" means a powder that absorbs energy such as from an electron beam, an X-ray, an ultraviolet light or an electric field, and efficiently releases a portion of this energy as visible light (light emission).

In addition, in the present invention "scintillator" means a substance that absorbs a radiation such as a γ-ray or an X-ray and emits an electromagnetic wave in visible light or at a wavelength near visible light (the wavelength region of the light may spread from near-ultraviolet to near-infrared), as well as, a constitutive member of a radiation detector provided with such a function.

In the present invention, when noted "X to Y" (X and Y are arbitrary numbers), unless expressly specified, the meaning of "X or above but Y or below" is included along with the meaning of "preferably larger than X" or "preferably smaller than Y".

In addition, when noted "X or greater" (X is an arbitrary number) or "Y or less" (Y is an arbitrary number), the intent to the effect of "larger than X is desirable" or "smaller than Y is desirable" is included.

EXAMPLES

Hereinafter, the present invention will be described based on examples. However, the present invention is not to be interpreted by being limited to these.

<XRD Measurement>

Using RINT-TTRIII (manufactured by RIGAKU), XRD patterns were obtained using a Cu target for the beam source, with 2θ in the range of 5 to 80° (refer to the conditions described below).

(bulb) CuKα beam
(tube voltage) 40 kV
(tube current) 150 mA
(sampling interval) 0.02°
(scan speed) 4.0°/min
(starting angle) 5°
(finish angle) 80°

<Photoluminescence Measurement>

The phosphor powders obtained in the Examples and Comparative Examples were analyzed using the spectrometer Spectra Pro 2300i (Princeton Instruments) and the CCD detector PI-MAX1024 (Princeton Instruments), using an ArF excimer laser LPF205 (Lambda Physik; wavelength: 193 nm) as excitation light.

The fluorescence decay time was fitted according to the following formula:

$$I = A_0 + A \exp(-T/\tau)$$

I: light-emission intensity; T: time; and τ: fluorescence decay time,

Example 1

Used as starting raw materials were 4N (99.99%) $Lu_2O_3$ and 4N (99.99%) $Pr_6O_{11}$, the respective starting raw materials were weighed, blended and mixed with a mortar, and the obtained mixture was fired in a hydrogen sulfide atmosphere at 1,100° C. for 48 hours to obtain a phosphor powder comprising a crystal represented by $(Lu_{0.995}Pr_{0.005})_2S_3$.

When the generation rates of the $Lu_2S_3$ phase, the $Lu_2O_2S$ phase ($Lu_2S_3$ phase/($Lu_2S_3$ phase+$Lu_2O_2S$ phase)) were determined from the ratio of diffraction intensities from the XRD pattern of the phosphor powder synthesized in Example 1, that is to say, the ratio between the peak height of peak A and the peak height of peak B in FIG. 1, 91.94% was obtained, such that the $Lu_2O_2S$ phase was contained in small amounts.

Figure 2:
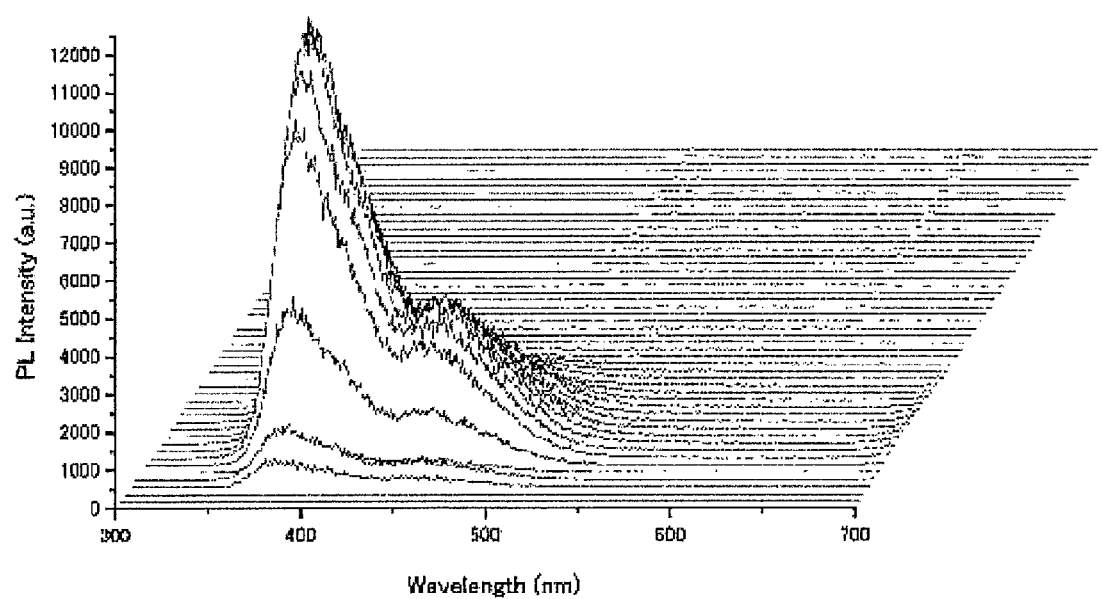
FIG. 2 A PL emission spectrum of the phosphor powder synthesized in Example 1.

In addition, the emission spectra measured every 2 nsec by exciting the phosphor powder synthesized in Example 1 with the ArF excimer laser LPF230 (Lambda Physik; wavelength: 193 nm) are shown in FIG. 2. As a result, a strong light emission was observed at 388 nm.

In addition, when a decay curve for light emission at 388 nm was extracted from the above emission spectra and the fluorescence decay time (τ) was determined from the formula described above, τ=5 nsec was obtained.

Examples 2 to 4 and Example 10

Phosphor powders were obtained similarly to Example 1, except that in Example 1, the firing time (Example 1: 48 hours; Example 2: 4 hours; Example 3: 8 hours; Example 4: 40 hours; and Example 10: 32 hours) was varied.

In Example 1, fired at 1,100° C. for 48 hours means that the time during which 1,100° C. was being maintained was 48 hours, and the firing times in the other Examples 2 to 4 and 10 also mean firing temperature retention times.

In addition, for the Examples 1 to 4, heating was in argon atmosphere in the beginning and switched to hydrogen sulfide atmosphere once the temperature was raised to 500° C.; in contrast, for Example 10, firing was carried out in hydrogen sulfide atmosphere from the beginning.

Figure 5:
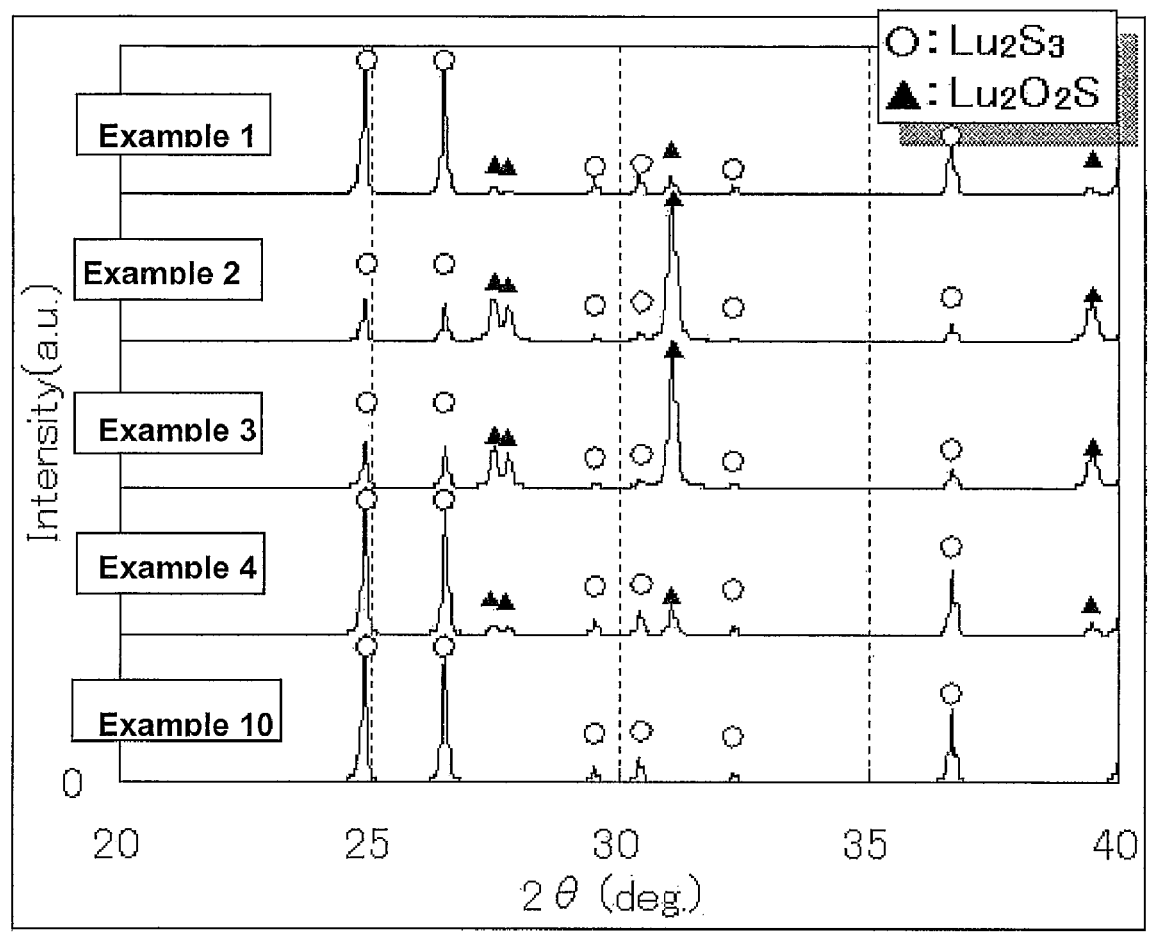
FIG. 5 Figure in which the XRD patterns of the phosphor powders synthesized in Examples 1 to 4 and 10 are shown aligned.

The generation rates of the $Lu_2S_3$ phase and the $Lu_2O_2S$ phase were determined from the ratios of diffraction intensities from the XRD patterns (FIG. 5) of the phosphor powders synthesized in Examples 1 to 4 and 10, that is to say, the ratio between the peak height of peak A and the peak height of peak B shown in FIG. 1, and shown in Table 2 along with the PL (Photoluminescence) intensities (PL Intensity (a.u.)) at 388 nm.

Since the phosphor powder obtained in Example 10 contained no $Lu_2O_2S$ phase, it can be considered that the light-emission is due to $Lu_2S_3$.

TABLE 2

| | $Lu_2S_3$ (%) | $Lu_2O_2S$ (%) | PL Intensity (a.u.) | Decay time (nsec) |
|---|---|---|---|---|
| Example 1 | 91.94 | 8.06 | 19164 | 5 |
| Example 2 | 21.56 | 78.44 | 4489 | 7 |
| Example 3 | 23.25 | 76.75 | 8632 | 9 |
| Example 4 | 85.45 | 14.55 | 21194 | 7 |
| Example 10 | 100.00 | 0.00 | 13435 | 5 |

As a result, since the higher the proportion occupied by the $Lu_2S_3$ phase, the stronger the light-emission obtained, containing the $Lu_2S_3$ phase at 20% or more, of which 85% or more, of which 95% or more, can be considered to be particularly desirable.

Example 5

Used as starting raw materials were 4N (99.99%) $Lu_2O_3$ and 4N (99.99%) $Ce_2S_3$, the respective starting raw materials were weighed, blended and mixed with a mortar, and the obtained mixture was fired in a hydrogen sulfide atmosphere at 1,100° C. for 40 hours to obtain a phosphor powder comprising a crystal represented by $(Lu_{0.995}Ce_{0.005})_2S_3$.

Figure 3:
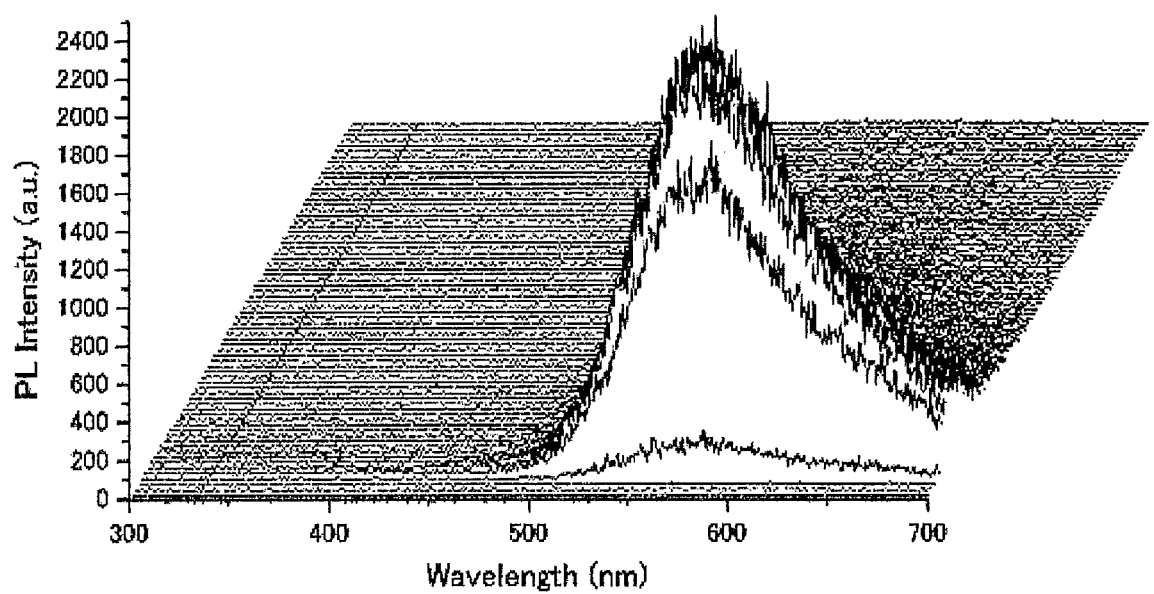
FIG. 3 A PL emission spectrum of a phosphor powder synthesized in Example 5.

The emission spectra measured every 5 nsec by exciting the phosphor powder synthesized in Example 5 with the ArF excimer laser LPF205 (Lambda Physik; wavelength: 193 nm) are shown in FIG. 3. As a result, a light emission was observed strongly at 580 nm.

In addition, when a decay curve for light emission at 580 nm was extracted from the above emission spectra and the fluorescence decay time (τ) was determined from the formula described above, τ=32 nsec was obtained.

From this, it was observed that a phosphor containing $Pr^{3+}$ as activator agent ion is not only more exceptional from the point of view of shortness of fluorescence decay time (τ), but also a phosphor containing $Ce^{3+}$ as activator agent ion is useful, emitting light sufficiently shortly and strongly in the visible light region.

Comparative Example 1 and Examples 6 to 9

Phosphor powders comprising a crystal represented by $(Lu_{1-x}Pr_x)_2S_3$ was obtained similarly to Example 2, except that in Example 2, the addition amount of 4N (99.99%) $Pr_6O_{11}$ was changed.

Figure 4:
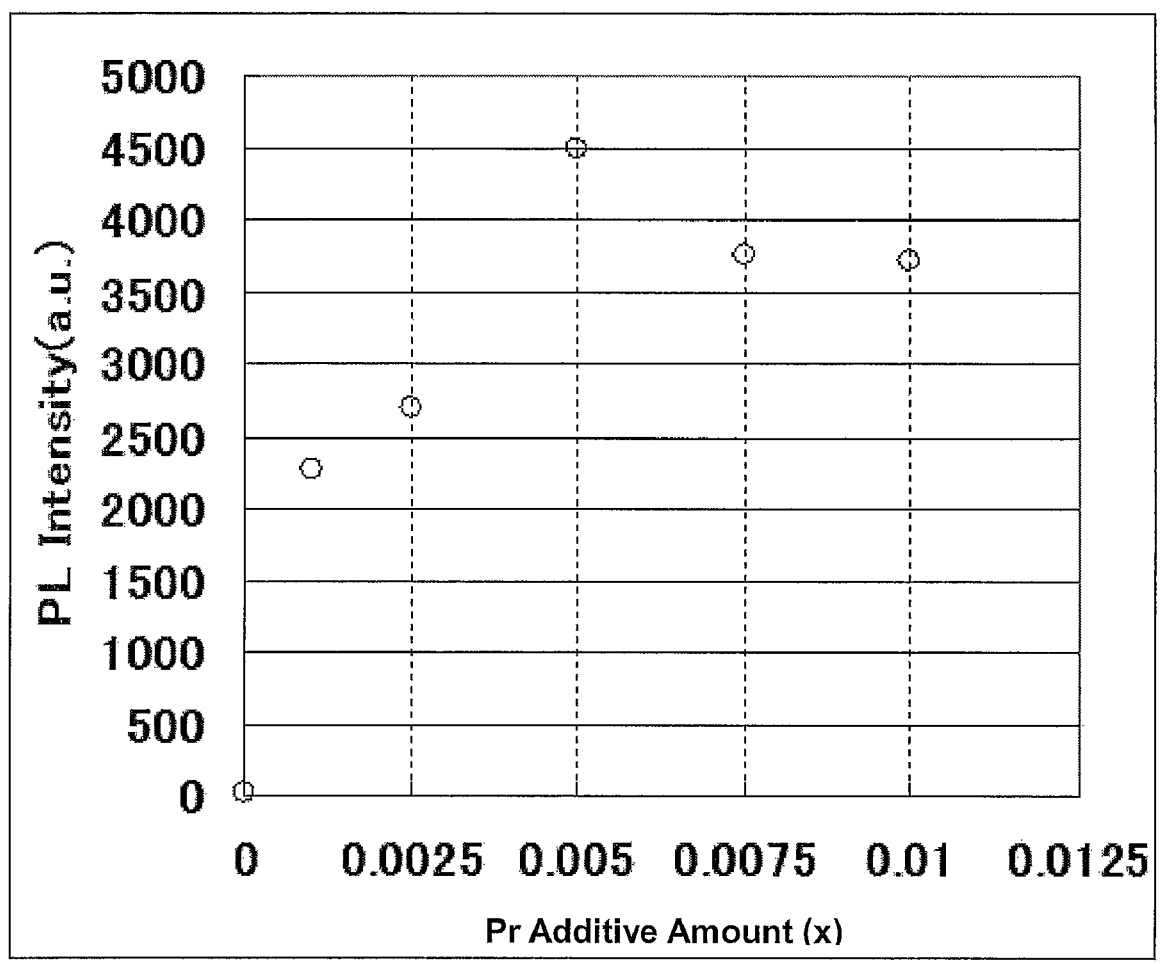
FIG. 4 A graph showing measurement results for the phosphor powders obtained in Example 1 (x=0.005), Examples 6 to 9 and Comparative Example 1 (x=0), in coordinates consisting of: horizontal axis: Pr addition amount (x) and vertical axis: PL intensity (a.u.)

For the phosphor powders obtained in Example 1 (x=0.005), Examples 6 to 9 and Comparative Example 1 (x=0), the PL (photoluminescence) intensities (PL Intensity (a.u.)) at 388 nm are shown in FIG. 4.

From this, in a phosphor containing a crystal represented by general formula $(Lu_{1-x}M_x)_2S$ (where M represents an activator agent element), PL intensities of 2,000 (a.u.) or greater can be obtained if the addition amount (x) of the activator agent element (M) is 0.001 or greater, and since the upper limit value is thought to be probably on the order of 0.1, it is thought that 0.001 to 0.1 is desirable. In addition, if x is 0.0025 or greater, PL intensities of 2,500 (a.u.) or greater can be obtained, such that an optimal value can be inferred to be in the neighborhood of 0.004 to 0.015.

(Discussion)

Phosphor powders that contain a lutetium sulfide-containing host material and $Pr^{3+}$ or $Ce^{3+}$ as activator agent ion were found to have especially short fluorescence-decay times. Among them, phosphor powders that contain a lutetium sulfide-containing host material and $Pr^{3+}$ as activator agent ion were found to photo-emit visible light and to have especially short light-decay times. Consequently, phosphor powders that contain a lutetium sulfide-containing host material and $Pr^{3+}$ as activator agent ion are thought to be particularly useful as novel phosphor for scintillators used in various detection devices such as PET devices.

The invention claimed is:

1. A phosphor for scintillator containing a composition represented by the general formula $(Lu1-xPrx)S3$, wherein x is from 0.001 to 0.1.

* * * * *

UNITED STATES PATENT AND TRADEMARK OFFICE
CERTIFICATE OF CORRECTION

PATENT NO. : 8,323,530 B2
APPLICATION NO. : 13/496254
DATED : December 4, 2012
INVENTOR(S) : Tsukasa Takahashi et al.

It is certified that error appears in the above-identified patent and that said Letters Patent is hereby corrected as shown below:

Face of the Patent, Column 2, Item (57), Abstract, Line 2, delete "light, and" and insert -- light and --

Column 8, Line 13, Claim 1, delete "(Lu1-xPrx)S3," and insert -- $(Lu_{1-x}Pr_x)_2S_3$, --

Signed and Sealed this
Twelfth Day of February, 2013

Teresa Stanek Rea
*Acting Director of the United States Patent and Trademark Office*